(12) United States Patent
Kwon et al.

(10) Patent No.: US 11,904,694 B2
(45) Date of Patent: Feb. 20, 2024

(54) FLUID-SEALED ENGINE MOUNT

(71) Applicants: HYUNDAI MOTOR COMPANY, Seoul (KR); KIA CORPORATION, Seoul (KR)

(72) Inventors: Young Jun Kwon, Yongin-si (KR); Yong Bin Park, Bucheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 416 days.

(21) Appl. No.: 17/354,207

(22) Filed: Jun. 22, 2021

(65) Prior Publication Data

US 2022/0126669 A1   Apr. 28, 2022

(30) Foreign Application Priority Data

Oct. 26, 2020   (KR) .................. 10-2020-0138849

(51) Int. Cl.
*B60K 5/12*   (2006.01)
*F16F 15/023*   (2006.01)

(52) U.S. Cl.
CPC .......... *B60K 5/1225* (2013.01); *F16F 15/023* (2013.01)

(58) Field of Classification Search
CPC ................................ F16F 13/10; F16F 13/102
See application file for complete search history.

(56) References Cited

U.S. PATENT DOCUMENTS

2012/0049423 A1\* 3/2012 Ishikawa ............... F16F 13/106
267/140.13
2016/0195154 A1\* 7/2016 Komiya .................. F16F 13/08
267/140.13

\* cited by examiner

*Primary Examiner* — Melanie Torres Williams
(74) *Attorney, Agent, or Firm* — Lempia Summerfield Katz LLC

(57) ABSTRACT

A fluid-sealed engine mount controls the movement of an engine mounted to a vehicle body and insulates from vibration. In particular, the fluid-sealed engine mount improves vibration damping performance and dynamic characteristics compared to a conventional engine mount, thereby enhancing noise, vibration, and harshness (NVH) performance.

10 Claims, 12 Drawing Sheets

[ A-A VIEW ]

[ D-D VIEW ]

→ : flow of the fluid

→ : flow of the fluid

→ : flow of the fluid

FIG.16 "PRIOR ART"

FLUID-SEALED ENGINE MOUNT

CROSS REFERENCE TO RELATED APPLICATION

This application claims priority to and the benefit of Korean Patent Application No. 10-2020-0138849, filed on Oct. 26, 2020, the entire contents of which are incorporated herein by reference.

FIELD

The present disclosure relates generally to a fluid-sealed engine mount and, more particularly, to a fluid-sealed engine mount controlling movement of an engine mounted to a vehicle body and insulating from vibration.

BACKGROUND

The statements in this section merely provide background information related to the present disclosure and may not constitute prior art.

In general, an engine mount is used to control movement of an engine and to insulate a vehicle from vibration. As a conventional engine mount, a fluid-sealed engine mount insulating from engine vibration occurring over a wide frequency band is used.

The conventional fluid-sealed engine mount uses an insulator and fluid to absorb engine vibration. The insulator is attached to a mount core that is connected to the engine and receives engine vibration. The fluid absorbs engine vibration while passing through a fluid passage that is positioned between an upper fluid chamber and a lower fluid chamber that are arranged below the insulator. The upper fluid chamber and the lower fluid chamber are partitioned by a membrane and a nozzle unit that are arranged between the upper fluid chamber and the lower fluid chamber, and the fluid passage is provided in the nozzle unit.

FIG. 16 is a view showing an assembled state between the membrane and the nozzle unit for the conventional fluid-sealed engine mount.

As shown in FIG. 16, a membrane 1 is fixed to a nozzle unit 2 as an edge of the membrane 1 is mounted to a center portion of a nozzle unit 2, and the membrane 1 moves along flow of the fluid in the upper fluid chamber and the lower fluid chamber to absorb engine vibration.

The membrane 1 generates noise by hitting the nozzle unit 2 during the movement along the fluid flow. In order to reduce the noise, the edge of the membrane 1 is mounted to the center portion of the nozzle unit 2 without a vertically overlapping section or a horizontal clearance with the nozzle unit 2.

However, we have discovered that when the edge of the membrane 1 is mounted to the nozzle unit 2 without the horizontal clearance, the following problems are caused.

First, when the membrane 1 moves along the fluid flow, noise due to friction between the membrane 1 and the nozzle unit 2 is generated, and the friction deteriorates robustness of the membrane 1 and the nozzle unit 2.

Second, when robustness of the membrane 1 is increased, dynamic characteristics of the engine mount are increased, and when robustness of the membrane 1 is reduced, damping performance of the engine mount is reduced, so there is a limit to tuning the characteristic of the engine mount.

SUMMARY

The present disclosure proposes a fluid-sealed engine mount, wherein vibration damping performance is improved and dynamic characteristics is reduced-improved compared to the conventional engine mount, thereby enhancing noise, vibration, and harshness (NVH) performance.

In one aspect of the present disclosure, a fluid-sealed engine mount may include: a nozzle unit partitioning a fluid chamber into an upper fluid chamber and a lower fluid chamber, and including a fluid passage provided for fluid flow between the upper fluid chamber and the lower fluid chamber; and a membrane arranged in a center portion of the nozzle unit in a radial direction of the nozzle unit and elastically vibrating by the fluid flow. In particular, the fluid chamber may be surrounded by an insulator and a diaphragm and be filled with fluid, and the membrane may include: a membrane lip, which may be formed by extending in a circumferential direction of the membrane at an edge portion thereof and be inserted in and fixed to an inner circumferential portion of the nozzle unit. In another form, the membrane lip may include a membrane channel provided at a portion of the membrane lip in the circumferential direction thereof, and the nozzle unit may include a ring-shaped nozzle groove portion in which the membrane lip may be inserted and arranged, and a nozzle channel provided at an inner circumferential portion of the nozzle groove portion, and the nozzle channel may provide the fluid passage for the fluid flow together with the membrane channel.

The membrane channel may be arranged to be collinear with the nozzle channel based on a radial direction of the membrane.

The nozzle unit may include: a nozzle lower plate having a lower groove portion at an upper surface portion thereof; and a nozzle upper plate mounted to the upper surface portion of the nozzle lower plate while being stacked, and having an upper groove portion at a lower surface portion thereof to constitute the nozzle groove portion together with the lower groove portion, wherein an upper inner rim portion that may be an inner circumferential portion of the nozzle upper plate may have an upper channel adjacent to the upper groove portion, a lower rim portion that may be an inner circumferential portion of the nozzle lower plate may have a lower channel adjacent to the lower groove portion, and the upper channel may constitute the nozzle channel together with the lower channel.

The membrane lip may include: a lip upper protrusion formed by protruding upward, and having an upper surface portion that may be in close contact with an upper surface of the upper groove portion; a lip lower protrusion formed by protruding downward, and having a lower surface portion that may be in close contact with a lower surface of the lower groove portion; and a lip side protrusion formed by protruding outward in a radial direction of the membrane lip, and having an outer circumferential surface that may be in close contact with an outer circumferential surface of the lower groove portion.

The nozzle unit may include a flow limiting portion arranged to be adjacent to each of opposite sides of the nozzle channel in a circumferential direction of the nozzle unit, and the flow limiting portion may be in close contact with the membrane lip to limit the fluid flow to the nozzle channel and the membrane channel.

The flow limiting portion may include: an upper limiting protrusion that may be formed on the lower surface portion of the nozzle upper plate and be arranged adjacent to the upper channel, and be in close contact with the inner circumferential surface and the outer circumferential surface of the lip upper protrusion and in close contact with an upper surface of the lip side protrusion and an upper surface of a center portion of the membrane; and a lower limiting protrusion that may be formed on the upper surface portion of the nozzle lower plate and be arranged adjacent to the lower channel, and be in close contact with the inner circumferential surface and the outer circumferential surface of the lip lower protrusion and in close contact with a lower surface of the lip side protrusion and a lower surface of the center portion of the membrane.

The nozzle upper plate may include a plurality of upper support portions in the upper groove portion, the upper support portions being arranged to be spaced apart from each other in a circumferential direction of the upper groove portion, and each of the upper support portions may include: a first upper support protrusion formed by protruding from an outer circumferential surface of the upper inner rim portion and positioned in close contact with an inner circumferential surface of the lip upper protrusion; and a second upper support protrusion formed by protruding from an inner circumferential surface of an upper outer rim portion arranged on an outer circumference of the upper groove portion, and positioned in close contact with an outer circumferential surface of the lip upper protrusion.

The nozzle lower plate may include a plurality of lower support portions in the lower groove portion, the lower support portions being arranged to be spaced apart from each other in a circumferential direction of the lower groove portion, and each of the lower support portions may include: a first lower support protrusion formed by protruding from an outer circumferential surface of the lower rim portion and positioned in close contact with an inner circumferential surface of the lip lower protrusion; and a second lower support protrusion formed by protruding from an inner circumferential surface of a ring-shaped boss, which may be an outer circumferential portion of the lower groove portion, and positioned in close contact with an outer circumferential surface of the lip lower protrusion.

A radial width of the nozzle groove portion may be greater than a radial width of the membrane lip.

The nozzle lower plate may include a ring-shaped boss that may be in close contact with the lower surface portion of the nozzle upper plate, the ring-shaped boss may include a connection passage arranged on the same line in a radial direction of the nozzle lower plate as the nozzle channel on an upper surface portion thereof, and the connection passage may be configured to connect the nozzle channel to the fluid passage in a fluid flow manner.

Through the above-described technical solution, the present disclosure provides the following effects.

First, compared to the conventional engine mount, additional tuning factors, such as the membrane channel, the nozzle channel, and the connection passage of the nozzle lower plate, are secured. Accordingly, low dynamic characteristics can be realized and vibration damping performance can be increased, so that NVH performance and ride quality under various road conditions can be improved.

Second, the membrane lip is supported by the upper support portion of the nozzle upper plate and the lower support portion of the nozzle lower plate. Accordingly, a contact area between the membrane lip, the nozzle upper plate, and the nozzle lower plate can be minimized, so that friction noise due to the movement of the membrane can be reduced.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 16 is a view showing the assembled state between the membrane and the nozzle unit for a conventional fluid-sealed engine mount.

Figure 1:
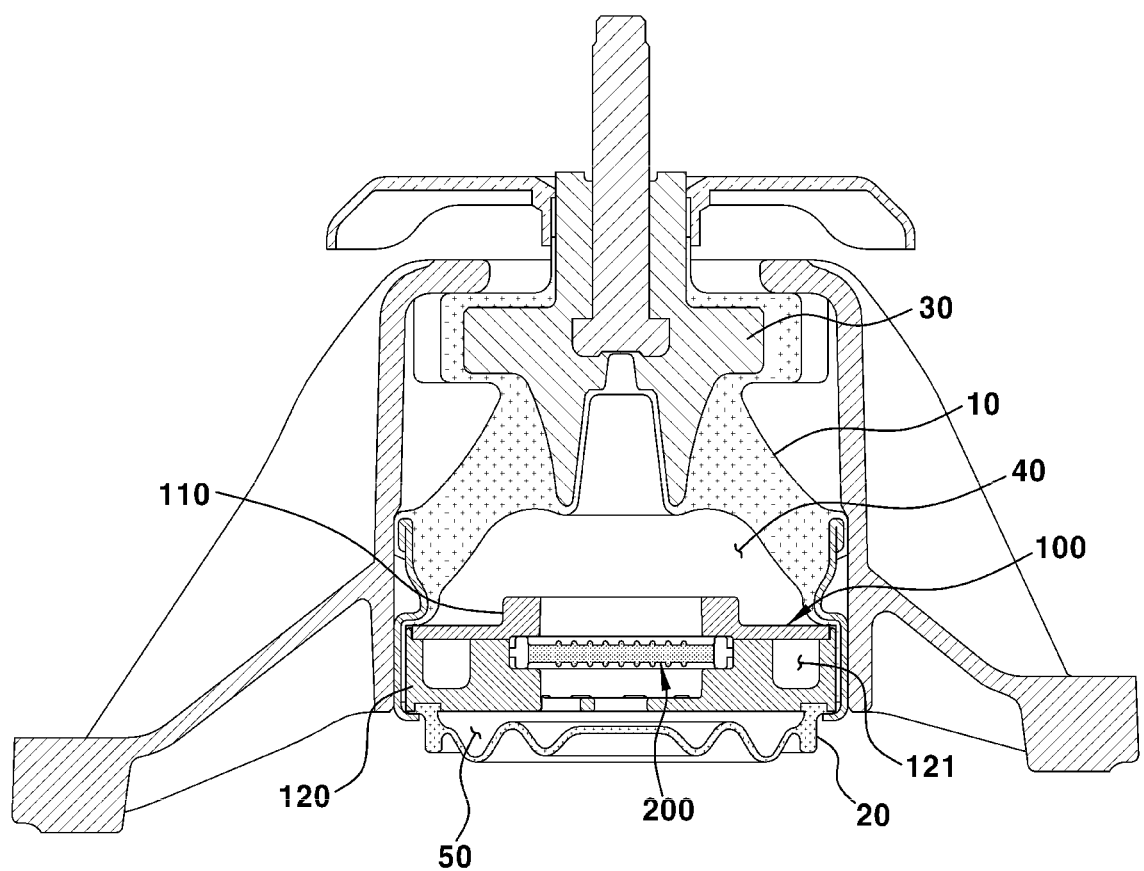
FIG. 1 is a view showing a configuration of a fluid-sealed engine mount according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinbelow, exemplary forms of the present disclosure will be described in detail with reference to the accompanying drawings. Items shown in the accompanying drawings are schematic drawings in order to easily describe the form of the present disclosure and may be different from those actually realized forms.

Unless the context clearly indicates otherwise, it will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

The present disclosure relates to a fluid-sealed engine mount having improved damping performance and reduced-improved dynamic characteristics compared to the existing engine mount, thereby enhancing noise, vibration, and harshness (NVH) performance.

The fluid-sealed engine mount is a mount that is sealed with fluid in an internal fluid chamber, and is installed between an engine and a vehicle body for vibration insulation.

As shown in FIG. 1, in the fluid-sealed engine mount of the present disclosure, the fluid chamber surrounded by an insulator 10 and a diaphragm 20 is filled with fluid.

The insulator 10 is vulcanized and attached to an outer surface of a mount corner 30 connected to the engine, and receives engine vibration through the mount corner 30.

The diaphragm 20 is arranged under the insulator 10 and provides the fluid chamber of the engine mount together with the insulator 10.

The fluid chamber is partitioned into an upper fluid chamber 40 and a lower fluid chamber 50 by a nozzle unit 100, and the nozzle unit 100 has a fluid passage 121 provided for the flow of the fluid between the upper fluid chamber 40 and the lower fluid chamber 50.

The fluid serves to absorb engine vibration together with the insulator 10. The fluid may absorb large displacement vibration within a low frequency band while passing through the fluid passage 121 between the upper fluid chamber 40 and the lower fluid chamber 50.

The nozzle unit 100 partitions the fluid chamber into the upper fluid chamber 40 and the lower fluid chamber 50 together with a membrane 200.

The membrane 200 is arranged at the center portion in a radial direction of the nozzle unit 100 and elastically vibrates by the fluid flow. In detail, the membrane 200 absorbs the engine vibration while vertically vibrating as the mount of the fluid is increased or decreased.

As shown in FIGS. 2 to 7, the membrane 200 includes a membrane body 210, which is positioned at a center portion of the membrane 200, and a membrane lip 220 formed by protruding from a circumferential surface of the membrane body 210.

The membrane body 210 is formed in a disc shape with a vertically predetermined thickness, and the membrane lip 220 is formed to extend on a circumferential surface of the membrane body 210 in a circumferential direction thereof.

The membrane body 210 may be arranged in an open center portion of the nozzle unit 100 to be under pressure of the fluid, and may vibrate by the pressure of the fluid acting on an upper surface portion and a lower surface portion thereof. In other words, the membrane body 210 may vertically vibrate as engine vibration is input into the insulator 10.

The membrane lip 220 is a ring-shaped rim of the membrane 200 and is inserted in and fixed to an inner circumferential portion of the nozzle unit 100.

Figure 2:
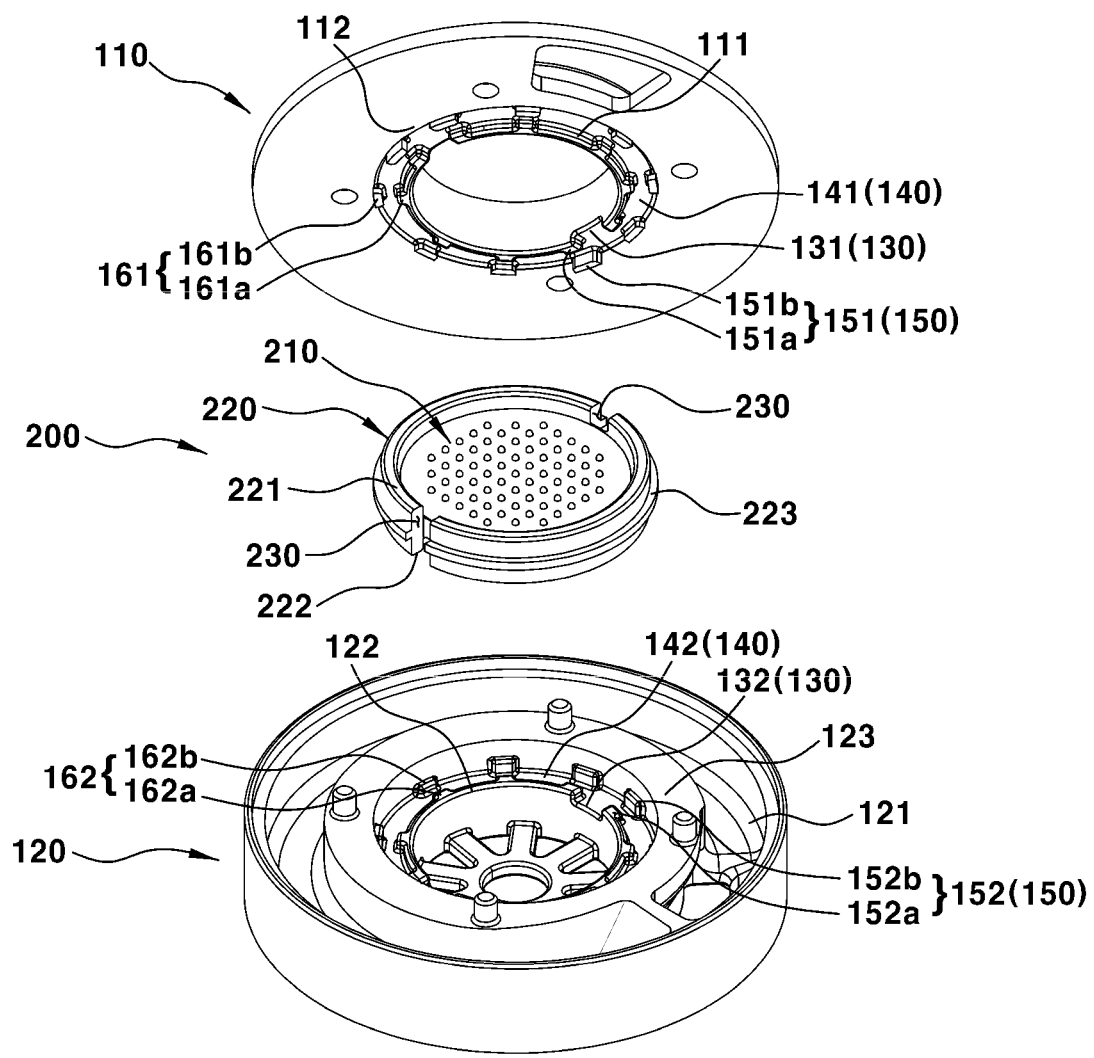
FIG. 2 is a perspective view showing a nozzle unit and a membrane of the configuration of the fluid-sealed engine mount according to a first form of the present disclosure.
Figure 3:
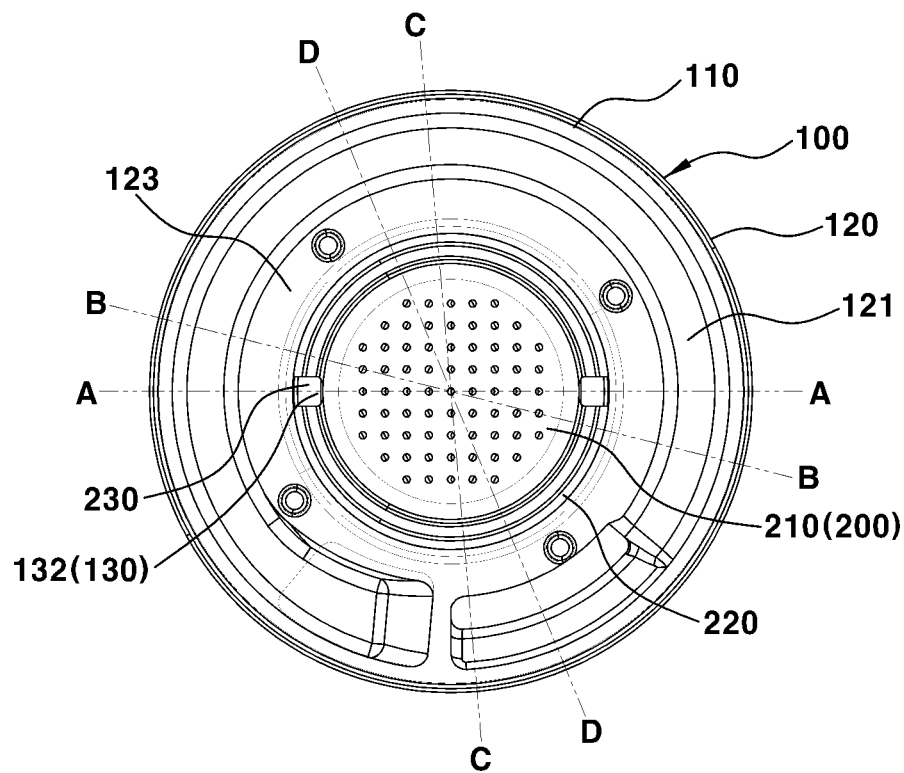
FIG. 3 is a view showing an assembled state between the nozzle unit and the membrane according to the first form of the present disclosure.

The membrane lip 220 may have at least one membrane channel 230 in a circumferential direction thereof. For example, as shown in FIG. 2, the membrane lip 220 may include two membrane channels 230, and the two membrane channels 230 may be arranged to face each other.

The membrane channel 230 is a portion where the membrane lip 220 is not formed in the rim of the membrane 200, and the membrane channel 230 serves as a passage for the fluid flow.

In order to enable fluid flow in the membrane channel 230, the nozzle unit 100 includes a nozzle channel 130 that is arranged to be radially collinear with the membrane channel 230.

Figure 4:
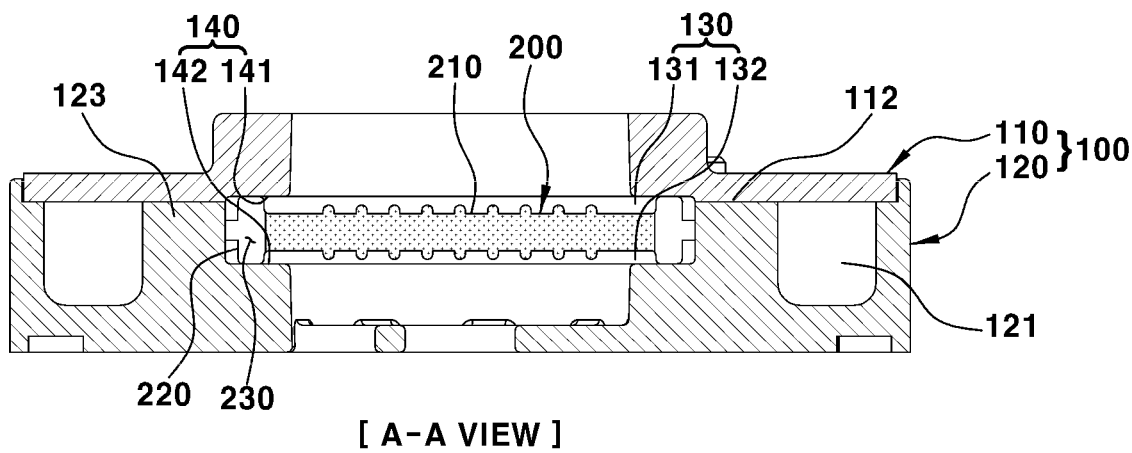
FIG. 4 is a view taken along line A-A in FIG. 3.

A ring-shaped nozzle groove portion 140 is positioned outside the open center portion of the nozzle unit 100 so that the membrane lip 22 is inserted therein, and the nozzle channel 130 is provided in an inner circumferential portion (i.e., upper inner rim portion and lower rim portion) of the nozzle groove portion 140. For example, as shown in FIGS. 2 and 4, the nozzle unit 100 may have two nozzle channels 130, and the two nozzle channels 130 may be arranged to face each other.

The nozzle channel 130 provides a passage for the fluid flow together with the membrane channel 230, and the fluid may move between the upper fluid chamber 40 and the lower fluid chamber 50 while passing through the nozzle channel 130 and the membrane channel 230. The fluid may absorbs vibration in small displacement vibration within a high frequency band while flowing through the nozzle channel 130 and the membrane channel 230.

Figure 8:
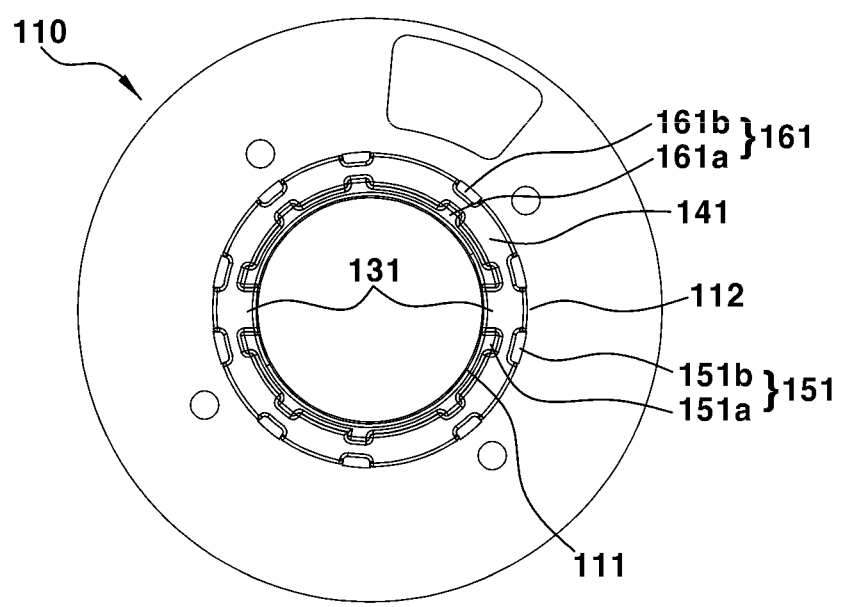
FIG. 8 is a bottom view showing a nozzle upper plate of a configuration of the nozzle unit according to the first form of the present disclosure.
Figure 9:
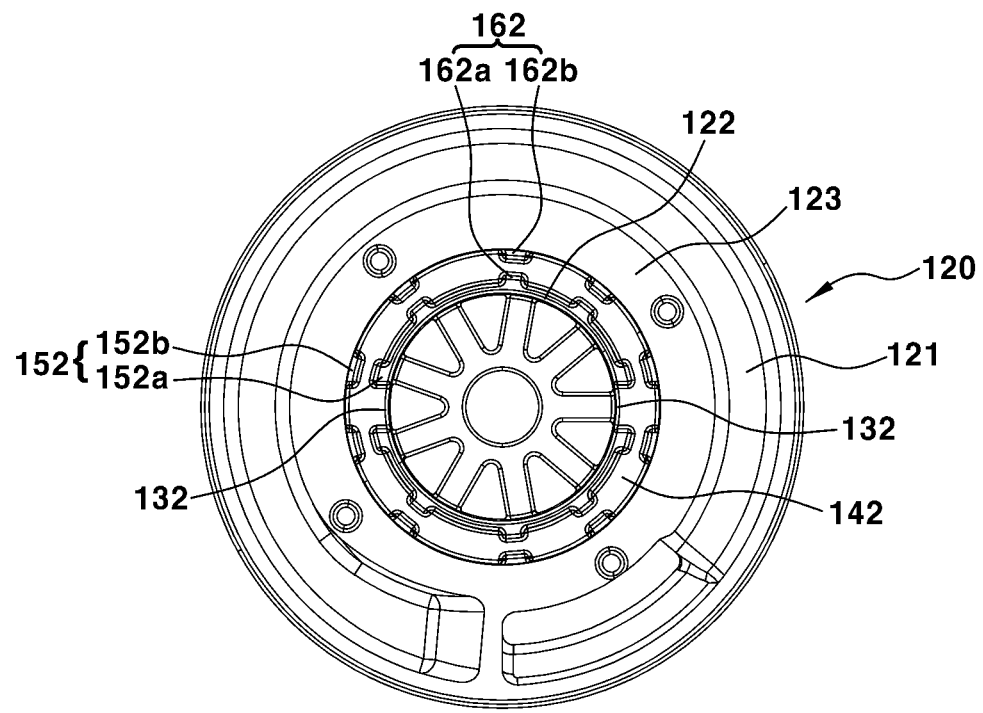
FIG. 9 is a plan view showing a nozzle lower plate of the configuration of the nozzle unit according to the first form of the present disclosure.

As shown in FIGS. 2, 8, and 9, the nozzle groove portion 140 includes an upper groove portion 141 of a nozzle upper plate 110 of a lower groove portion 142 of a nozzle lower plate 120.

The nozzle unit 100 includes the nozzle upper plate 110 that has the upper groove portion 141 on a lower surface portion thereof, and the nozzle lower plate 120 has the lower groove portion 142 on an upper surface portion thereof.

The nozzle upper plate 110 is mounted by being press-fitted in a stacked shape on the upper surface of the nozzle lower plate 120. As shown in FIG. 4, when the nozzle upper plate 110 is mounted to the nozzle lower plate 120, the upper groove portion 141 is arranged by being stacked above the lower groove portion 142. The upper groove portion 141 provides the nozzle groove portion 140 together with the lower groove portion 142 arranged below the upper groove portion 141. Therefore, the sum of a vertical depth of the upper groove portion 141 and a vertical depth of the lower groove portion 142 becomes a vertical depth of the nozzle groove portion 140.

The nozzle upper plate 110 has an open center portion, and the upper groove portion 141 is arranged outside the center portion of the nozzle upper plate 110. Whereby, fluid pressure of the upper fluid chamber 40 acts on the upper surface portion of the membrane body 210 through the center portion of the nozzle upper plate 110.

An upper channel 131 adjacent to the upper groove portion 141 is provided at an upper inner rim portion 111, which is an inner circumferential portion of the nozzle upper plate 110. Specifically, the nozzle upper plate 110 has the ring-shaped upper inner rim portion 111 at the inner circumferential portion thereof, and the upper channel 131 is formed in at least one portion in a circumferential direction of the upper inner rim portion 111. The upper channel 131 serves to open a section in the circumferential direction of the upper inner rim portion 111.

The nozzle lower plate 120 has an open center portion, and the lower groove portion 142 is arranged outside the center portion of the nozzle lower plate 120. Thus, the lower fluid pressure of fluid chamber 50 acts on the lower surface portion of the membrane body 210 through the center portion of the nozzle lower plate 120.

A lower channel 132 adjacent to the lower groove portion 142 is provided at a lower rim portion 122, which is an inner circumferential portion of the nozzle lower plate 120. Specifically, the nozzle lower plate 120 has the ring-shaped lower rim portion 122 at the inner circumferential portion thereof, and the lower channel 132 is formed in at least one portion in a circumferential direction of the lower rim portion 122. The lower channel 132 serves to open a section in the circumferential direction of the lower rim portion 122.

The upper channel 131 and the lower channel 132 constitute the nozzle channel 130, and the upper channel 131 and the lower channel 132 are arranged to be radially collinear with the membrane channel 230. In detail, the upper channel 131 is arranged above the membrane channel 230 and the lower channel 132 is arranged below the membrane channel 230.

In the nozzle lower plate 120, the fluid passage 121 is provided radially outside the lower groove portion 142, and an upper end of the fluid passage 121 is covered by the nozzle upper plate 110.

Figure 5:
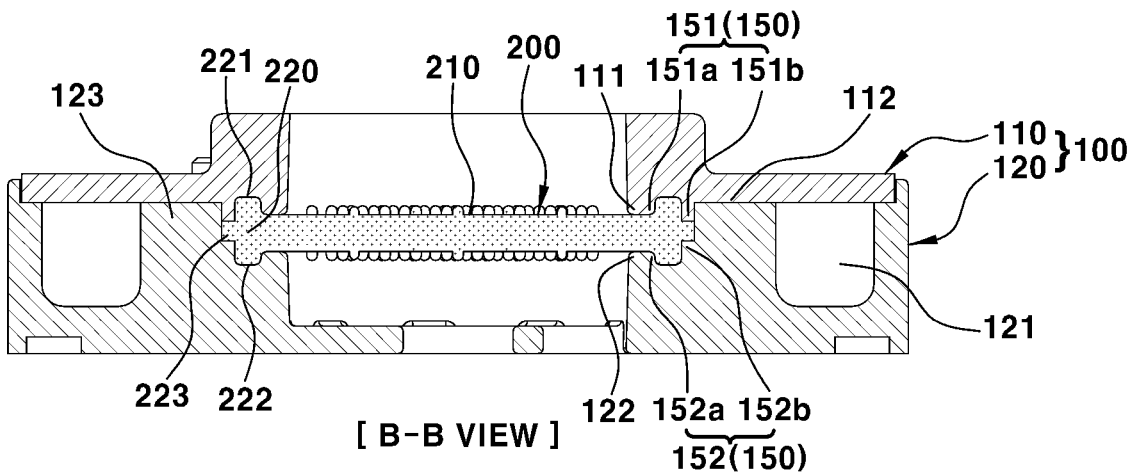
FIG. 5 is a view taken long line B-B in FIG. 3.

As shown in FIGS. 2 and 5, the membrane lip 220 includes a lip upper protrusion 221, a lip lower protrusion 222, and a lip side protrusion 223.

The lip upper protrusion 221 protrudes upward from the membrane lip 220 and extends in the circumferential direction of the membrane lip 220, and is arranged between the membrane channels 230. The lip upper protrusion 221 is fixed in close contact with the upper groove portion 141 as an upper surface portion of the lip upper protrusion 221 overlaps with an upper surface (i.e., ceiling surface) of the upper groove portion 141.

The lip lower protrusion 222 protrudes downward from the membrane lip 220 and extends in the circumferential direction of the membrane lip 220, and is arranged between the membrane channels 230. The lip lower protrusion 222 is fixed in close contact with the lower groove portion 142 as a lower surface portion of lip lower protrusion 222 overlaps with a lower surface (i.e., bottom surface) of the lower groove portion 142.

The lip side protrusion 223 protrudes radially outward from the membrane lip 220 and extends in the circumferential direction of the membrane lip 220, and is arranged between the membrane channels 230. The lip side protrusion 223 is fixed in close contact with the lower groove portion 142 as a side surface portion (i.e., outer circumferential surface) of the lip side protrusion 223 overlaps with an outer circumferential surface (i.e., an inner circumferential surface of the ring-shaped boss 123) of the lower groove portion 142.

Meanwhile, in order to flow the fluid only through the membrane channel 230 and the nozzle channel 130, i.e., in order to prevent the fluid from flowing between the membrane lip 220 and the nozzle unit 100 excluding the membrane channel 230 and the nozzle channel 130, the nozzle unit 100 includes a flow limiting portion 150, as shown in FIGS. 2 and 5.

The flow limiting portion 150 is arranged adjacent to each of opposite sides of the nozzle channel 130 in a circumferential direction of the nozzle unit 100. The flow limiting portion 150 is in close contact with the membrane lip 220 to form a wall at both the nozzle channel 130 and the membrane channel 230, whereby allowing the fluid to flow only through the membrane channel 230 and the nozzle channel 130.

In detail, when the fluid of the upper fluid chamber 40 and the lower fluid chamber 50 moves through the nozzle channel 130 and the membrane channel 230, the flow limiting portion 150 blocks the fluid flow between the upper fluid chamber 40 and the lower fluid chamber 50, except for the fluid flow through the nozzle channel 130 and the membrane channel 230.

That is, the flow limiting portion 150 may limit the fluid flow only through the nozzle channel 130 and the membrane channel 230, and the fluid may move between the upper fluid chamber 40 and the lower fluid chamber 50 only through the nozzle channel 130 and the membrane channel 230.

In other words, the flow limiting portion 150 may limit the fluid flowing through the nozzle channel 130 and the membrane channel 230 from flowing between the membrane lip 220 and the nozzle unit 100. The flow limiting portion 150 may inhibit or prevent the fluid from flowing in the nozzle groove portion 140 in the circumferential direction of the nozzle groove portion 140.

The flow limiting portion 150 may include an upper limiting protrusion 151 formed on the lower surface portion of the nozzle upper plate 110, and a lower limiting protrusion 152 formed on the upper surface portion of the nozzle lower plate 120.

The upper limiting protrusion 151 is arranged to be adjacent to the upper channel 131 of the nozzle channel 130. The upper limiting protrusion 151 is in close contact with an inner circumferential surface and an outer circumferential surface of and the lip upper protrusion 221. At the same time, the upper limiting protrusion 151 is in close contact with an upper surface of the lip side protrusion 223 and an upper surface of a center portion of the membrane 200 (i.e., the upper surface of the membrane body 210).

The upper limiting protrusion 151 serves as a wall limiting the fluid flow on one side of the upper channel 131 and the membrane channel 230.

Specifically, the upper limiting protrusion 151 may include a first upper limiting protrusion 151a and a second upper limiting protrusion 151b.

The first upper limiting protrusion 151a is formed by protruding radially outward from the upper inner rim portion 111, which is the inner circumferential portion of the nozzle upper plate 110. In other words, the first upper limiting protrusion 151a is formed by protruding from an outer circumferential surface of the upper inner rim portion 111 and is arranged in the upper groove portion 141.

The second upper limiting protrusion 151b is formed by protruding radially inward from the upper outer rim portion 112 of the nozzle upper plate 110. In other words, the second upper limiting protrusion 151b is formed by protruding from an inner circumferential surface of the upper outer rim portion 112 and is arranged in the upper groove portion 141. Specifically, an upper end portion of the second upper limiting protrusion 151b is arranged in the upper groove portion 141, and a lower end of the second upper limiting protrusion 151b protruding downward from the upper groove portion 141 and is arranged in the lower groove portion 142.

The upper outer rim portion 112 is arranged radially outside the upper inner rim portion 111, and the upper groove portion 141 is arranged between the upper inner rim portion 111 and the upper outer rim portion 112. The upper outer rim portion 112 is arranged at an outer circumference of the upper groove portion 141.

The lower limiting protrusion 152 is arranged to be adjacent to the lower channel 132. The lower limiting protrusion 152 is in close contact with an inner circumferential surface and an outer circumferential surface of the lip lower protrusion 222, and at the same time, is in close contact with a lower surface of the lip side protrusion 223 and a lower surface of the center portion of the membrane 200 (i.e., the lower surface of the membrane body 210).

The lower limiting protrusion 152 serves as a wall limiting the fluid flow at one side of the lower channel 132 and the membrane channel 230.

In detail, the lower limiting protrusion 152 may include a first lower limiting protrusion 152a and a second lower limiting protrusion 152b.

The first lower limiting protrusion 152a is formed by protruding outward in the radial direction from the lower rim portion 122, which is the inner circumferential portion of the nozzle lower plate 120. In other words, the first lower limiting protrusion 152a is formed by protruding from an outer circumferential surface of the lower rim portion 122 and is arranged in the lower groove portion 142.

The second lower limiting protrusion 152b is formed by protruding radially inward from a ring-shaped boss 123 of the nozzle lower plate 120. In other words, the second lower limiting protrusion 152b is formed by protruding from an inner circumferential surface of the ring-shaped boss 123, which is the outer circumferential portion of the lower groove portion 142, and is arranged in the lower groove portion 142.

The ring-shaped boss 123 is a portion provided in the nozzle lower plate 120 to be arranged between the lower groove portion 142 and the fluid passage 121 and to extend in a circumferential direction of the nozzle lower plate 120. The ring-shaped boss 123 is in close contact with the lower surface of the nozzle upper plate 110 to block the fluid flow.

In addition, the upper limiting protrusion 151 and the lower limiting protrusion 152 may serve to support the membrane lip 220 arranged in the nozzle groove portion 140.

Figure 7:
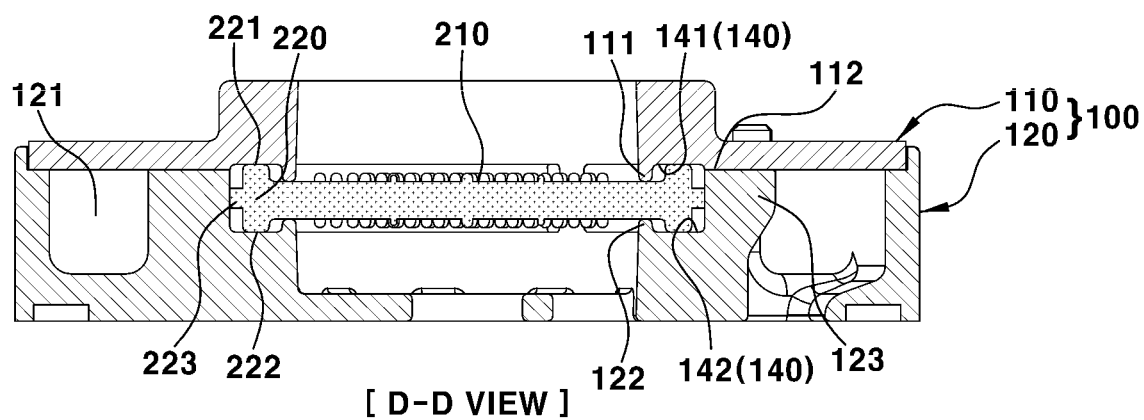
FIG. 7 is a view taken along line D-D in FIG. 3.

Meanwhile, as shown in FIG. 7, the nozzle groove portion 140 has a radial width greater than a radial width of the membrane lip 220. In detail, the radial width of the nozzle groove portion 140 is greater than the sum of a radial width of the lip upper protrusion 221 and a radial width of the lip side protrusion 223.

Figure 6:
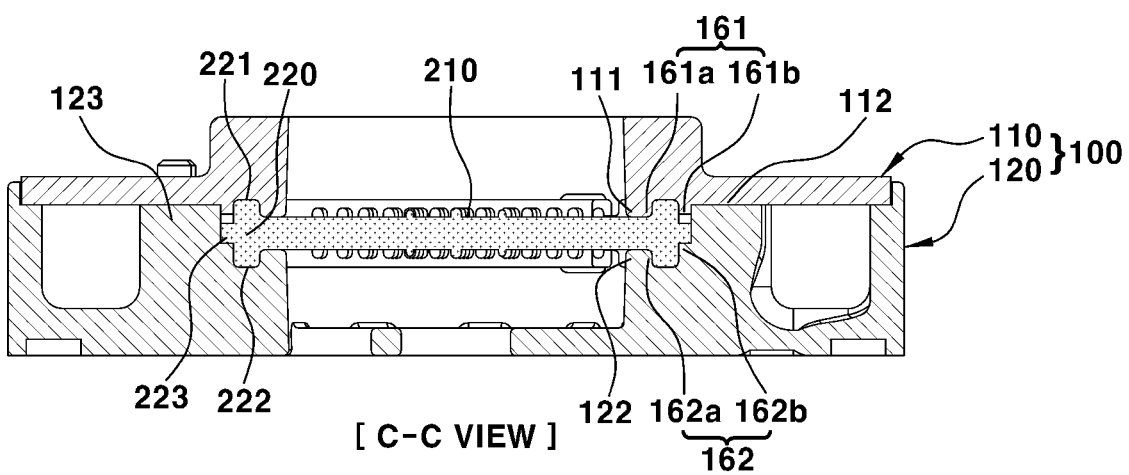
FIG. 6 is a view taken long line C-C in FIG. 3.

In order to support and fix the membrane lip 220 arranged in the nozzle groove portion 140, as shown in FIGS. 2 and 6, the nozzle upper plate 110 has a plurality of upper support portions 161 and the nozzle lower plate 120 has a plurality of lower support portions 162.

Specifically, the nozzle upper plate 110 has the plurality of upper support portions 161, which are formed by protruding radially from the upper inner rim portion 111 and the upper outer rim portion 112 in the lower surface portion of the nozzle upper plate 110 and are arranged with intervals in a circumferential direction in the upper groove portion 141. The nozzle lower plate 120 has the plurality of lower support portions 162, which are formed by protruding radially from the lower rim portion 122 and the ring-shaped boss 123 in the upper surface portion and arranged with intervals in the lower groove portion 142.

Each of the upper support portions 161 may include a first upper support protrusion 161a and a second upper support protrusion 161b.

The first upper support protrusion 161a is formed by protruding from the outer circumferential surface of the upper inner rim portion 111 and is in close contact with an upper inner circumferential surface of the membrane lip 220. In detail, the first upper support protrusion 161a is in close contact with the inner circumferential surface of the lip upper protrusion 221 and supports an upper portion of the membrane lip 220.

The second upper support protrusion 161b is formed by protruding from the inner circumferential surface of the upper outer rim portion 112 and is in close contact with an upper outer circumferential surface of the membrane lip 220. In detail, the second upper support protrusion 161b is in close contact with the outer circumferential surface of the lip upper protrusion 221 and supports the upper portion of the membrane lip 220.

Each of the lower support portions 162 may include a first lower support protrusion 162a and a second lower support protrusion 162b.

The first lower support protrusion 162a is formed by protruding from the outer circumferential surface of the lower rim portion 122 and is in close contact with a lower inner circumferential surface the membrane lip 220. In detail, the first lower support protrusion 162a is in close contact with the inner circumferential surface of the lip lower protrusion 222 and supports a lower portion of the membrane lip 220.

The second lower support protrusion 162b is formed by protruding from the inner circumferential surface of the ring-shaped boss 123 and is in close contact with a lower outer circumferential surface of the membrane lip 220. In detail, the second lower support protrusion 162b is in close contact with the outer circumferential surface of the lip lower protrusion 222 and supports the lower portion of the membrane lip 220.

Figure 10:
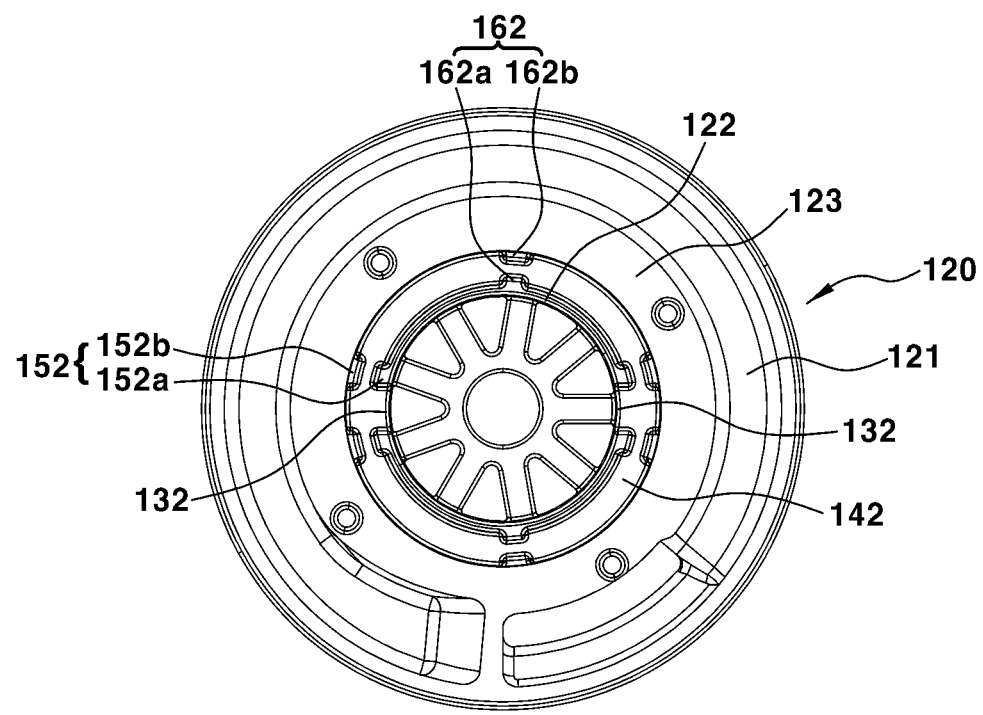
FIG. 10 is a plan view showing the nozzle lower plate according to a second form of the present disclosure.
Figure 11:
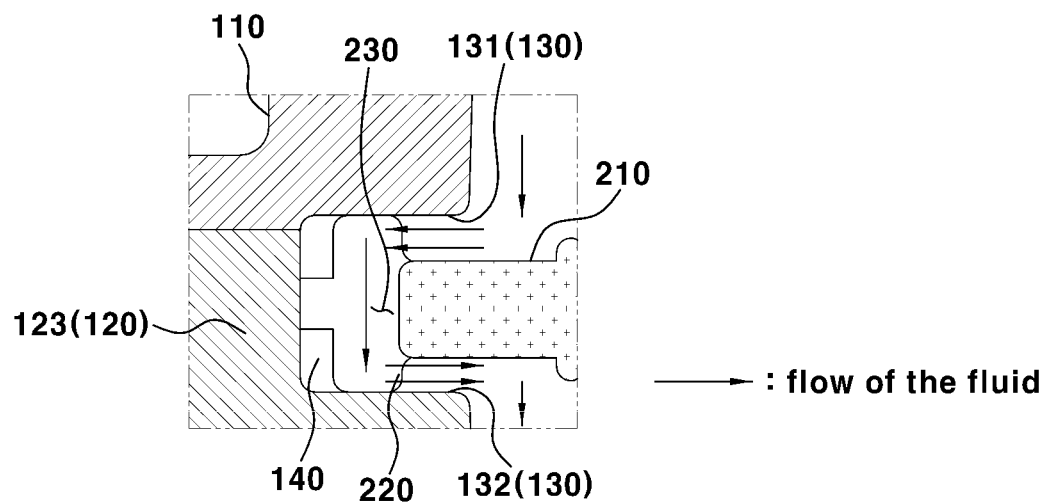
FIG. 11 is a view showing a flow path of a fluid passing through a space between the membrane and the nozzle unit according to the first form of the present disclosure.

The upper support protrusion 161a, 161b and the lower support protrusion 162a, 162b may tune a contact area with the membrane lip 220 by changing the number or a shape thereof. For example, the nozzle upper plate 110 may have the two upper support protrusions 161a and 161b and the nozzle lower plate 120 may have the two lower support protrusions 162a and 162b (referring to FIG. 10).

As the membrane lip 220 is supported by the upper support protrusions 161a and 161b and the lower support protrusions 162a and 162b, the contact area between the nozzle unit 100 and the membrane lip 220 may be reduced. Accordingly, friction noise caused by vibration of the membrane 200 may be reduced.

As shown in FIG. 7, in a section without the upper support portion 161 and the lower support portion 162, the inner and outer circumferential surfaces of the lip upper protrusion 221 and the inner and outer circumferential surfaces of the lip lower protrusion 222 are not in contact with the nozzle upper plate 110 and the nozzle lower plate 120.

The upper support protrusions 161a and 161b and the lower support protrusions 162a and 162b may be applied to the membrane lip 220 instead of the nozzle unit 100. In detail, the membrane lip 220 may include support protrusions that perform the same function as the upper support protrusions 161a and 161b and the lower support protrusions 162a and 162b.

Figure 12A:
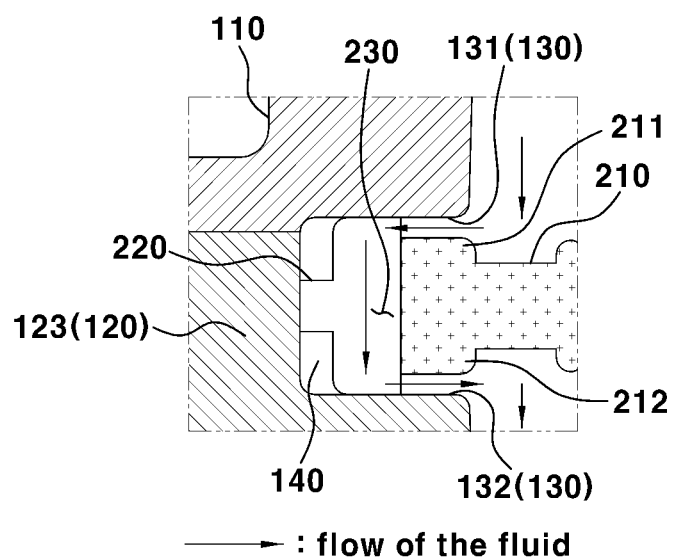
FIGS. 12A to 12C are views showing the flow path of the fluid passing through the space between the membrane and the nozzle unit according to the second form of the present disclosure.

Meanwhile, as shown in FIG. 12A, an upper tuning protrusion 211 and a lower tuning protrusion 212 may be formed by protruding from an edge portion at one side of the membrane body 210 that is arranged to be radially collinear with the membrane channel 230.

The upper tuning protrusion 211 is provided on the upper surface portion of the membrane body 210 and the lower tuning protrusion 212 is provided on the lower surface portion of the membrane body 210, so that a vertical distance between the membrane body 210 and the nozzle upper plate 110 and a vertical distance between the membrane body 210 and the nozzle lower plate 120 may be reduced. When the vertical distances are reduced as described above, a sectional area of the nozzle channel 130 in which the fluid passes may be reduced, and accordingly, the frequency band for reducing vibration may be relatively lowered.

Figure 12B:
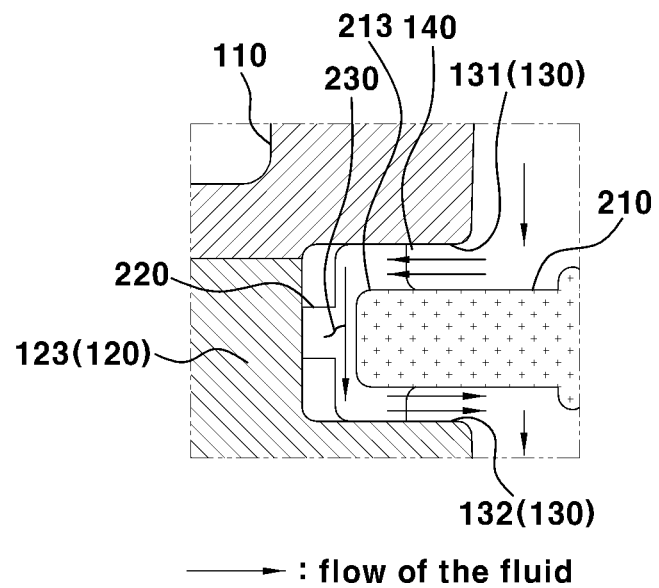

As shown in FIG. 12B, a side tuning protrusion 213 may be formed by protruding from a circumferential surface at one side of the membrane body 210 arranged to be radially collinear with the membrane channel 230.

When the side tuning protrusion 213 is formed by protruding from the circumferential surface of the membrane body 210 toward the membrane channel 230, it is possible to extend the movement path of the fluid passing through the membrane channel 230.

Figure 12C:
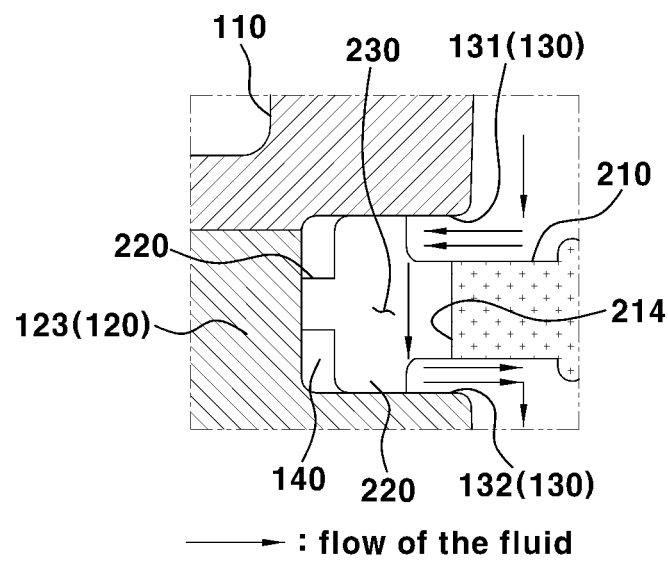

As shown in FIG. 12C, a tuning groove 214 may be formed on the circumferential surface at one side of the membrane body 210 arranged to be radially collinear with the membrane channel 230.

The tuning groove 214 is a portion that is radially recessed from the circumferential surface of the membrane body 210. The flowing path of the fluid passing through the membrane channel 230 may be shortened with respect to a radial width of the tuning groove 214. Accordingly, a frequency band for reducing vibration may be relatively increased.

Accompanying FIGS. 13 to 15B are views showing the nozzle unit 100 and the membrane 200 according to a second form of the present disclosure.

Figure 13:
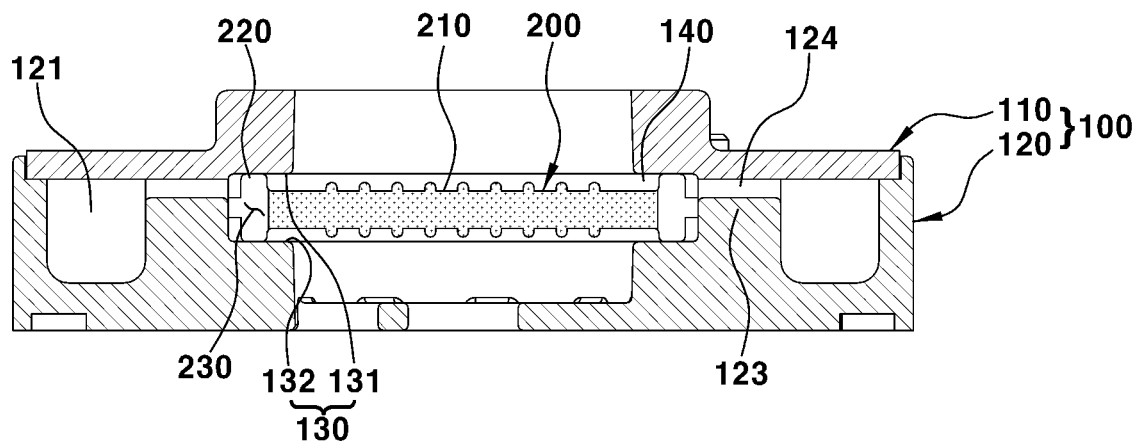
FIG. 13 is a view showing the assembled state between the nozzle unit and the membrane according to a third foam of the present disclosure.
Figure 14:
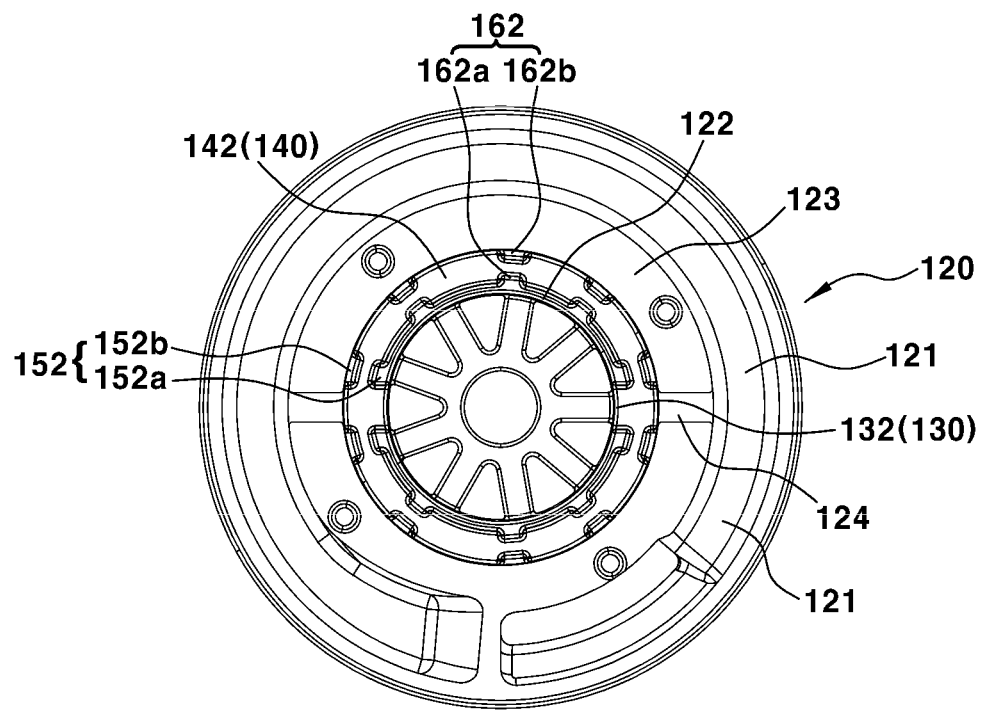
FIG. 14 is a plan view showing the nozzle lower plate according to the third form of the present disclosure.

As shown in FIGS. 13 and 14, the ring-shaped boss 123 of the nozzle lower plate 120 may have at least one connection passage 124 that is positioned to be radially collinear with the nozzle channel 130 at an upper surface portion of the ring-shaped boss 123.

The connection passage 124 connects the nozzle channel 130 and the membrane channel 230 to the fluid passage 121 so that the fluid may flow therethrough. Specifically, the connection passage 124 may be formed to extend in a radial direction of the nozzle lower plate on upper surface portion of the ring-shaped boss 123, and may be formed to have a vertical height smaller than a vertical height of the nozzle channel 130. The height of the connection passage 124 may differ from the height of the nozzle channel 130 by a predetermined value or more.

An upper end of the connection passage 124 is covered by the nozzle upper plate 110. In other words, the ring-shaped boss 123 forms the connection passage 124 together with the nozzle upper plate 110.

Figure 15A:
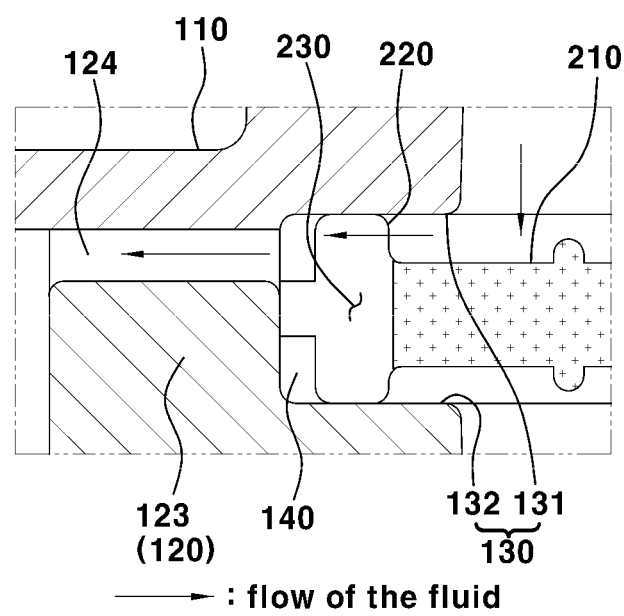
FIGS. 15A and 15B are views showing the flow path of the fluid passing through the space between the membrane and the nozzle unit according to the third form of the present disclosure.
Figure 15B:
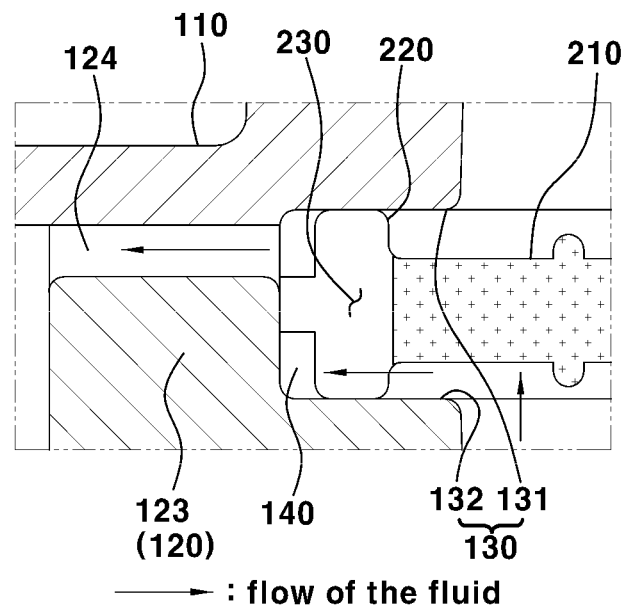
Figure 15B:
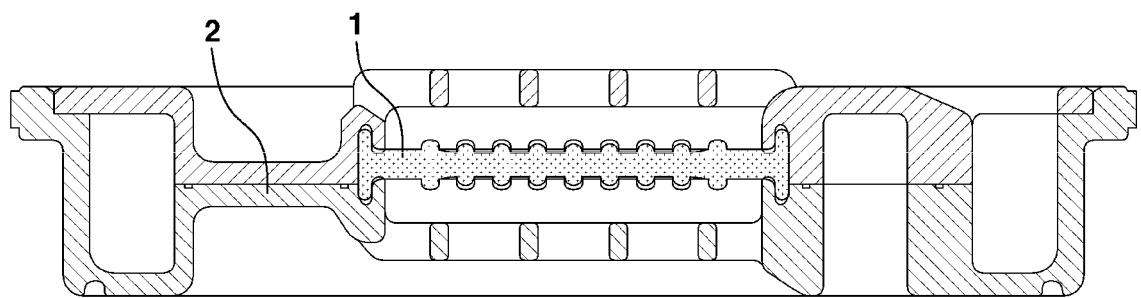

As shown in FIGS. 15A and 15B, fluid in the upper fluid chamber 40 or fluid in the lower fluid chamber 50 may move to the fluid passage 121 through the connection passage 124.

When the fluid flow occurs in the connection passage 124, i.e., the fluid in upper fluid chamber 40 or the lower fluid chamber 50 passes through the connection passage 124 and then flows toward the fluid passage 121, the fluid may absorb intermediate displacement vibration within an intermediate frequency band.

As shown in FIGS. 13, 15A and 15B, the edge portion at one side of the membrane body 210 is arranged within the nozzle channel 130 and the nozzle groove portion 140 in line with the membrane channel 230. As a vertical clearance between the upper surface portion of the membrane body 210 and the nozzle upper plate 110 and a vertical clearance between the lower surface portion of the membrane body 210 and the nozzle lower plate 120 are adjusted, the fluid flowing through the connection passage 124 may absorb vibration within a desired intermediate displacement band.

When the fluid flows through the connection passage 124, the fluid in the fluid passage 121 generates resonance to generate a damping force in the predetermined displacement band. Accordingly, the dynamic characteristics of the engine mount may be reduced and vibration transmitted to the vehicle body may be reduced.

A displacement band and a frequency band to decrease in vibration may be determined by adjusting a vertical clearance between the membrane body 210 and the nozzle unit 100 and a width and a length of the connection passage 124.

The engine mount of the present disclosure including the connection passage 124 may reduce not only the vibration within low displacement band and the vibration within high displacement band, but also the vibration within the intermediate displacement band. Accordingly, ride quality and NVH performance under various road conditions may be improved.

The exemplary forms of the present disclosure have been described in detail above, and it should be noted that the terms and words used in the specification and the claims should not be construed as being limited to ordinary meanings or dictionary definitions. Further, the forms described in the specification and the configurations illustrated in the drawings are merely examples and the scope and spirit of the present disclosure are not limited to the forms described hereinabove, and various modifications and improvements of those skilled in the art which uses the basic concept of the present disclosure defined by the appended claims are also included in the scope and spirit of the present disclosure.

What is claimed is:

1. A fluid-sealed engine mount comprising:
 a nozzle unit partitioning a fluid chamber into an upper fluid chamber and a lower fluid chamber, and comprising a fluid passage provided for a fluid flow between the upper fluid chamber and the lower fluid chamber, wherein the fluid chamber is surrounded by an insulator and a diaphragm and filled with fluid; and
 a membrane arranged in a center portion of the nozzle unit in a radial direction of the nozzle unit and configured to elastically vibrate by the fluid flow,
 wherein:
  the membrane comprises a membrane lip, which is formed by extending in a circumferential direction of the membrane at an edge portion thereof and is inserted in and fixed to an inner circumferential portion of the nozzle unit,
  the membrane lip comprises a membrane channel provided at at least one portion of the membrane lip in the circumferential direction thereof,
  the nozzle unit comprises a ring-shaped nozzle groove portion in which the membrane lip is inserted and arranged,
  a nozzle channel provided at an inner circumferential portion of the ring-shaped nozzle groove portion, and
  the nozzle channel provides the fluid passage for the fluid flow together with the membrane channel.

2. The fluid-sealed engine mount of claim 1, wherein the membrane channel is arranged to be collinear with the nozzle channel based on a radial direction of the membrane.

3. The fluid-sealed engine mount of claim 1, wherein the nozzle unit further comprises:
 a nozzle lower plate having a lower groove portion at an upper surface portion thereof; and
 a nozzle upper plate mounted to the upper surface portion of the nozzle lower plate while being stacked, and having an upper groove portion at a lower surface portion thereof to constitute the ring-shaped nozzle groove portion together with the lower groove portion,
 wherein an upper inner rim portion that is an inner circumferential portion of the nozzle upper plate has an upper channel adjacent to the upper groove portion, a lower rim portion that is an inner circumferential portion of the nozzle lower plate has a lower channel adjacent to the lower groove portion, and the upper channel constitutes the nozzle channel together with the lower channel.

4. The fluid-sealed engine mount of claim 3, wherein the membrane lip further comprises:
   a lip upper protrusion formed by protruding upward, and having an upper surface portion that is in close contact with an upper surface of the upper groove portion;
   a lip lower protrusion formed by protruding downward, and having a lower surface portion that is in close contact with a lower surface of the lower groove portion; and
   a lip side protrusion formed by protruding outward in a radial direction of the membrane lip, and having an outer circumferential surface that is in close contact with an outer circumferential surface of the lower groove portion.

5. The fluid-sealed engine mount of claim 4, wherein the nozzle unit further comprises a flow limiting portion arranged to be adjacent to each of opposite sides of the nozzle channel in a circumferential direction of the nozzle unit, and the flow limiting portion is in close contact with the membrane lip and configured to limit the fluid flow to the nozzle channel and the membrane channel.

6. The fluid-sealed engine mount of claim 5, wherein the flow limiting portion comprises:
   an upper limiting protrusion that is formed on the lower surface portion of the nozzle upper plate and is arranged adjacent to the upper channel, wherein the upper limiting protrusion is in close contact with an inner circumferential surface and the outer circumferential surface of the lip upper protrusion and further in close contact with an upper surface of the lip side protrusion and an upper surface of a center portion of the membrane; and
   a lower limiting protrusion that is formed on the upper surface portion of the nozzle lower plate and is arranged adjacent to the lower channel, wherein the lower limiting protrusion is in close contact with the inner circumferential surface and the outer circumferential surface of the lip lower protrusion and further in close contact with a lower surface of the lip side protrusion and a lower surface of the center portion of the membrane.

7. The fluid-sealed engine mount of claim 4, wherein the nozzle upper plate comprises a plurality of upper support portions in the upper groove portion, the plurality of upper support portions being arranged to be spaced apart from each other in a circumferential direction of the upper groove portion, and
   each upper support portion of the plurality of upper support portions comprises:
      a first upper support protrusion formed by protruding from an outer circumferential surface of the upper inner rim portion and positioned in close contact with an inner circumferential surface of the lip upper protrusion; and
      a second upper support protrusion formed by protruding from an inner circumferential surface of an upper outer rim portion arranged on an outer circumference of the upper groove portion, and positioned in close contact with an outer circumferential surface of the lip upper protrusion.

8. The fluid-sealed engine mount of claim 4, wherein the nozzle lower plate comprises a plurality of lower support portions in the lower groove portion, the plurality of lower support portions being arranged to be spaced apart from each other in a circumferential direction of the lower groove portion, and
   each lower support portion of the plurality of lower support portions comprises:
      a first lower support protrusion formed by protruding from an outer circumferential surface of the lower rim portion and positioned in close contact with an inner circumferential surface of the lip lower protrusion; and
      a second lower support protrusion formed by protruding from an inner circumferential surface of a ring-shaped boss, which is an outer circumferential portion of the lower groove portion, and positioned in close contact with an outer circumferential surface of the lip lower protrusion.

9. The fluid-sealed engine mount of claim 7, wherein a radial width of the ring-shaped nozzle groove portion is greater than a radial width of the membrane lip.

10. The fluid-sealed engine mount of claim 3, wherein:
   the nozzle lower plate comprises a ring-shaped boss that is in close contact with the lower surface portion of the nozzle upper plate,
   the ring-shaped boss comprises a connection passage arranged on the same line in a radial direction of the nozzle lower plate as the nozzle channel on an upper surface portion thereof, and
   the connection passage is configured to connect the nozzle channel to the fluid passage in a fluid flow manner.

* * * * *